(12) United States Patent
Gale et al.

(10) Patent No.: US 10,088,074 B2
(45) Date of Patent: Oct. 2, 2018

(54) FLUID CONTROL VALVE (71) Applicant: Jimmy One Limited, Ticehurst, East Sussex (GB)

(72) Inventors: Robin William Gale, Ticehurst (GB); Angus James Walker, Ticehurst (GB)

(73) Assignee: Jimmy One Limited, Ticehurst, East Essex (GB)

( * ) Notice: Subject to any disclaimer, the term of this patent is extended or adjusted under 35 U.S.C. 154(b) by 0 days.

(21) Appl. No.: 15/319,418

(22) PCT Filed: Jun. 17, 2015

(86) PCT No.: PCT/GB2015/051774
§ 371 (c)(1),
(2) Date: Dec. 16, 2016

(87) PCT Pub. No.: WO2015/193666
PCT Pub. Date: Dec. 23, 2015

(65) Prior Publication Data
US 2017/0130869 A1 May 11, 2017

(30) Foreign Application Priority Data
Jun. 17, 2014 (GB) .................................. 1410799.9

(51) Int. Cl.
*F16K 43/00* (2006.01)

(52) U.S. Cl.
CPC ......... *F16K 43/00* (2013.01); *Y10T 137/6188* (2015.04)

(58) Field of Classification Search
CPC ....................................................... F16K 43/00
See application file for complete search history.

(56) References Cited

U.S. PATENT DOCUMENTS

| 1,123,801 | A | 1/1915 | Robinson |
| 7,726,335 | B2 * | 6/2010 | Doble ................ F02M 37/0023 |
| | | | 137/542 |
| 8,701,715 | B1 | 4/2014 | Crompton et al. |

FOREIGN PATENT DOCUMENTS

| DE | 1110484 B | 7/1961 |
| EP | 0022672 A1 | 1/1981 |

(Continued)

OTHER PUBLICATIONS

International Search Report and Written Opinion dated Oct. 9, 2015 in corresponding PCT application No. PCT/GB2015/051774.

(Continued)

*Primary Examiner* — Kevin Lee
(74) *Attorney, Agent, or Firm* — Nields, Lemack & Frame, LLC (57) ABSTRACT

Fluid control valve including a valve body having an inlet, an outlet and defining a fluid flow path therebetween. A first valve is adjustable by a first valve actuator between a closed position preventing fluid flow through the first valve and an open position permitting fluid flow. A second valve is associated with the inlet or intermediate the inlet and the first valve, and includes a second valve body and a second valve actuator adapted such that the first valve actuator bears against the second valve actuator in each of the open and closed positions to urge the second valve into an open configuration allowing fluid flow. The first valve actuator is adjustable to a third position in which it is spaced from the second valve actuator by a separation sufficient to allow fluid pressure at the inlet to cause the second valve to close.

21 Claims, 6 Drawing Sheets

(56) References Cited

FOREIGN PATENT DOCUMENTS

| GB | 376628 A | 7/1932 |
| GB | 466311 A | 5/1937 |
| GB | 1025831 A | 4/1966 |
| WO | 95/00789 A1 | 1/1995 |
| WO | 2005/118966 A1 | 12/2005 |

OTHER PUBLICATIONS

British Search Report dated Dec. 17, 2014 in corresponding British application No. GB1410799.9.

* cited by examiner

FLUID CONTROL VALVE

BACKGROUND OF THE INVENTION

The present invention relates to fluid control and management. In particular, it relates to valves or regulators for controlling a flow of fluid, such as, but not limited to, taps and faucets.

Taps of the type mounted to baths, basins and sinks typically have a tap body mounted above the surface of the bath, basin or sink which tap body has a threaded body portion which extends below the surface such that the tap body is securable to the surface by means of a correspondingly threaded back nut. The tap body further includes at least one elongate supply pipe for operative connection to a water supply. A single tap has a single supply pipe and a mixer tap has two such pipes, conventionally referred to as "threaded tails". Typically, the elongate supply pipes are metal pipes having threaded connections to the threaded body portion. In mounting of the tap to the surface, the supply pipes are screwed into the tap body, the braided or flexible supply pipes and threaded body portion of the tap body are inserted through an aperture in the surface and the threaded nut is applied from underneath the surface to the threaded body portion and tightened to grip the tap body to the surface. The required connections to the water supplies are then made, typically using a compression fitting or a push-fit coupling.

Water regulations typically require that a shut-off or service valve is provided close to the tap so that the water supply can be easily closed to allow for replacement of washers etc., as necessary. However, by the time that washers need replacing, the bath, basin or sink has been installed and invariably enclosed within an enclosure such as within bath panels, a sink unit or basin vanity unit, giving exceptionally limited accessibility to the service valves. The present invention seeks to overcome this problem in taps and faucets, but also to provide a means for control of fluids in fluid lines generally.

SUMMARY OF THE INVENTION

In its broadest sense, the present invention provides a fluid control valve comprising a valve body having an inlet, for operative connection to a supply of pressurised fluid, and an outlet and defining a fluid flow path therebetween; and a first valve adjustable under the control of a first valve actuator between a first, or closed, position in which flow of fluid through the first valve is prevented and a second, or open, position in which flow of fluid through the first valve is permitted. The valve is characterised in that: the fluid control valve further comprises a second valve associated with the inlet or intermediate the inlet and the first valve, wherein the second valve comprises a second valve body and a second valve actuator adapted such that the first valve actuator bears against the second valve actuator in each of said first and second positions to urge the second valve into an open configuration allowing flow of fluid; and further wherein the fluid control valve is arranged such that the first valve actuator is adjustable to a third position in which the first valve actuator is spaced from the second valve actuator by a separation sufficient to allow fluid pressure at the inlet to cause the second valve to close, preventing flow of fluid through the fluid control valve.

Preferably, the second valve actuator is a rod.

Preferably, the second valve body and the second valve actuator are formed as a unitary element.

Advantageously, the unitary element has substantially the form of a poppet or mushroom valve.

Preferably, the unitary element comprises an axially fluted or flanged stem.

Preferably, the axial flutes or flanges are longitudinal flutes or flanges radially dimensioned to provide a close fit between the unitary element and the inner cylindrical wall or surface of the valve housing.

Suitably, the unitary element is formed of an alloy or polymeric material, preferably a polyoxymethylene.

Suitably, the first valve is a screw-down valve, gate valve, needle valve or globe valve, preferably a screw-down or globe valve.

Suitably, the first valve actuator is manually operatable actuator, such as a lever or wheel, or a pneumatically or electrically operatable actuator.

Preferably, the first valve includes a valve seat and a valve head including a valve gear to which is mounted a washer for adjustment of a separation between the washer and the valve seat as the first valve head is rotated between the first and second positions; and wherein the washer or a washer mounting bears against the second valve actuator as the valve head is adjusted between the first and second positions to cause the second valve to open and becomes spaced from the second valve actuator in the third position.

Preferably, the valve seat is demountable from the fluid control valve body.

Preferably, the second valve further comprises biasing means to apply a biasing force to the second valve sufficient to bias the valve into a rest or closed position in which the flow of fluid through the valve body is prevented.

Advantageously, the valve is in the form of a tap or faucet.

Preferably, the inlet is in the form of a tail for operative connection to a fluid supply and the outlet is in the form of a tap body having a spout.

Preferably, the tap body includes a valve seat and the tap head includes a tap gear to which is mounted a washer for adjustment of a separation between the washer and the valve seat as the tap head is rotated between the first and second positions; and wherein the washer or a washer mounting bears against the second valve actuator as the tap head is rotated between the first and second positions to cause the second valve to open and is spaced from the second valve body actuator in the third position by an amount sufficient to allow the second valve to close under the pressure of fluid at the inlet.

Preferably, the valve seat is demountable from the tap body.

Preferably, the first valve is mounted to the actuator.

Preferably, the valve body is demountable to the tap body.

Preferably, the valve body includes a threaded stem and has an enlarged head, wherein the tap body is securable to the enlarged head.

Preferably, the tail is formed integrally with the valve body.

Preferably, the valve body includes a first valve seat wherein the first valve seat is demountable to the tap body.

BRIEF DESCRIPTION OF THE DRAWINGS

The above and other aspects of the present invention will now be described in further detail, by way of example only, with respect to the accompanying drawings, in which.

DETAILED DESCRIPTION OF THE INVENTION

Figure 1:
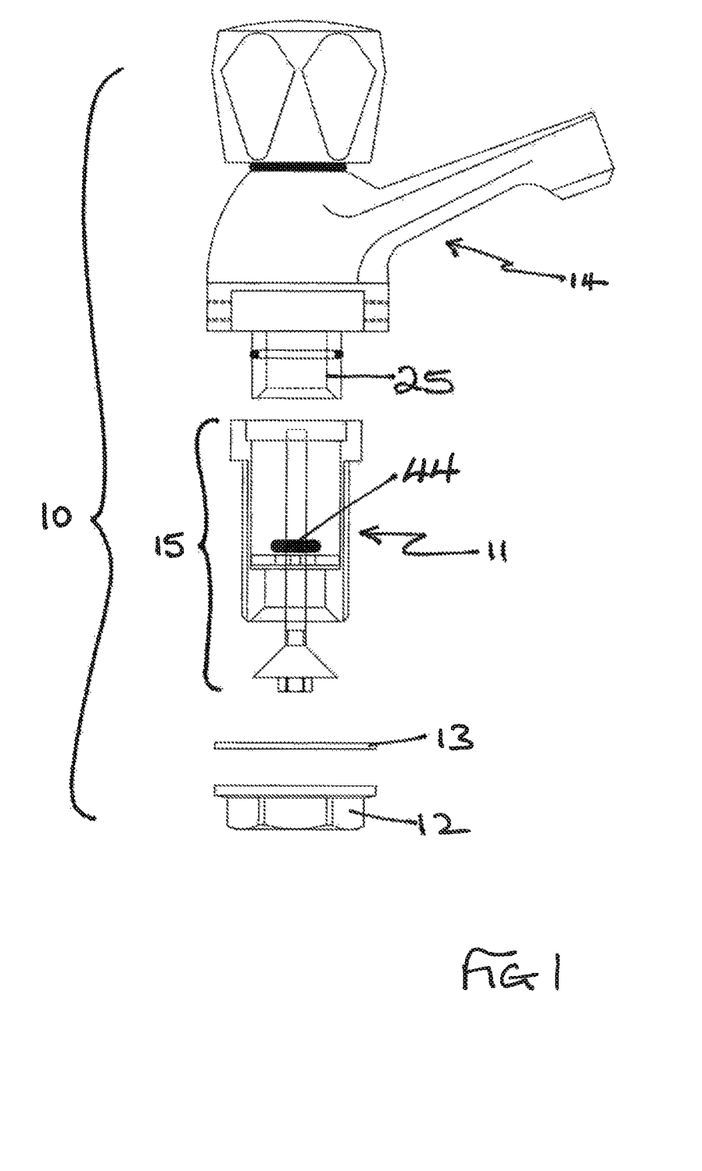
FIG. 1 is an exploded, part cross-sectional view of a first embodiment of a fluid control valve in accordance with the present invention in the form of a tap.
Figure 2:
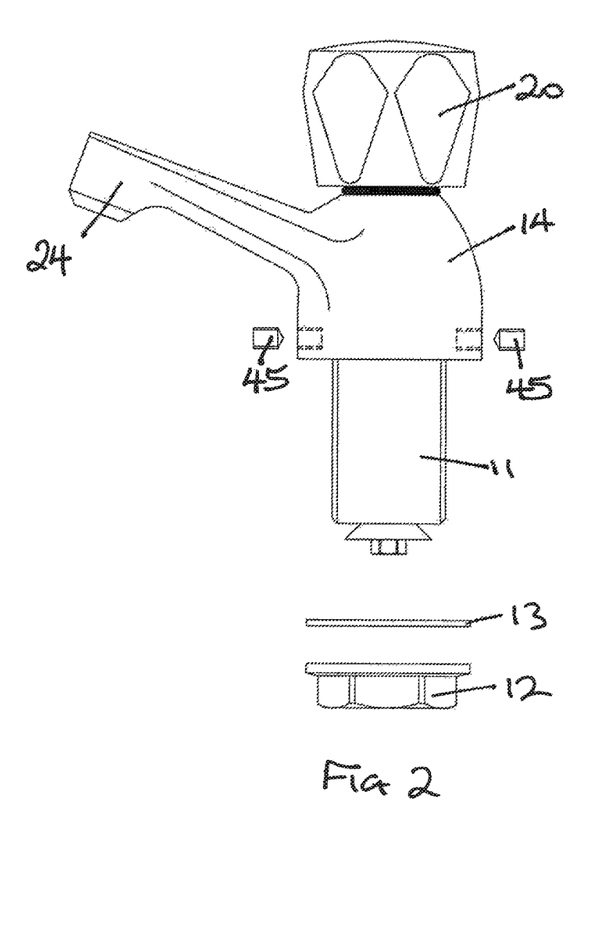
FIG. 2 is a side view of the tap of FIG. 1 in a first or operatively open configuration.
Figure 3:
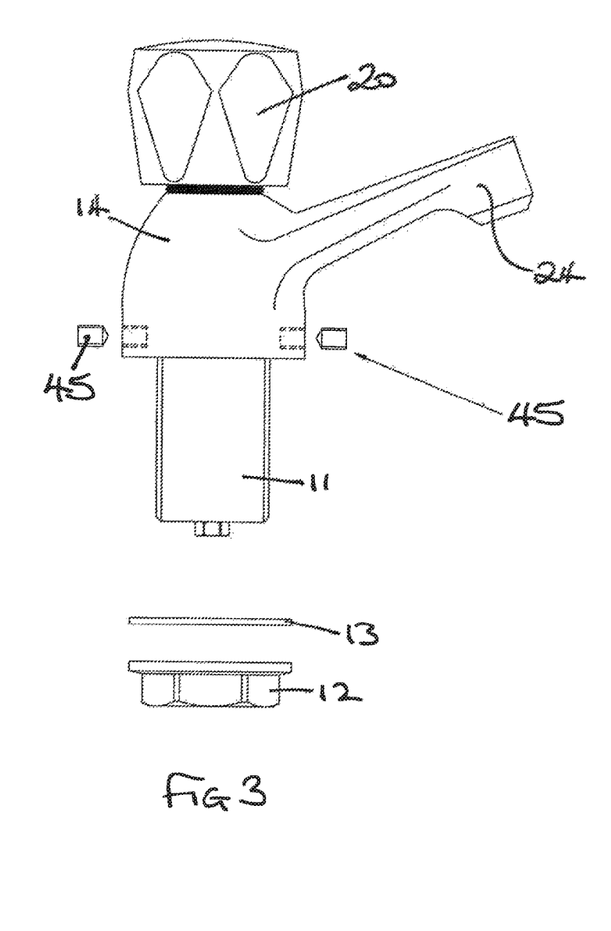
FIG. 3 is a side view of the tap of FIG. 1 in a second or operatively closed configuration.

Referring initially to FIGS. 1 to 3, there is shown a first embodiment of a fluid control valve in accordance with the present invention in the form of a tap assembly. The tap assembly 10 includes a threaded tail 11 of an inlet for operative fluid connection to a source of water by means of a compression coupling in a conventional manner. The tap is mountable in a conventional manner to a surface, such as the surface of a bath, basin or sink as appropriate, by means of a threaded nut 12 with a washer 13 interposed therebetween.

In accordance with the present invention, tap assembly 10 has two principal elements, tap body 14 and valve body 15. Tap body 14 includes a tap head including a rotatable handle 20 for adjustment, in a conventional manner, of a tap gear 21 (commonly known as a rising spindle), to the lower surface of which is mounted a washer 22. In a conventional manner, tap washer 22 bears against a tap seat 23 to allow flow of water through the tap body from the inlet through spout 24.

As shown, in preferred embodiments of the present invention, tap seat 23 is formed on a demountable cylindrical tap seat body 25 having a throughbore to allow for the passage of fluid therethrough. By providing the seat 23 on a demountable and therefore replaceable element, the tap seat can be readily replaced when life-expired without requiring replacement of the entire tap. This forms another aspect of the present invention. Tap seat body 25 is mountable to tap body 14 by means of a threaded male portion 26 formed to seat body 25 engageable with a correspondingly threaded female throughbore 27 formed within tap body 14 (threads omitted for clarity).

Valve body 15 includes a cylindrical valve housing 30 having an enlarged head which, in use, sits above the surface to which the tap is mounted, and a threaded outer surface forming tail 11 of the tap and having an inner cylindrical surface, which is stepped at a lower portion thereof such that the upper portion 32 of valve housing 30 is of greater internal diameter than the lower portion 33. Upper portion of valve housing 30 is dimensioned for sealable receipt of a lower portion of tap seat body 25. An O-ring seal 31 is provided to the lower portion of tap seat body 25 for provide a fluid seal between the two components.

Lower portion of valve housing 30 is formed with a frusto-conical seat surface 34. Valve body 15 further includes a valve plug 35 which bears, in use, against frusto-conical seat surface 34 to define a valve, closing the flow of fluid through valve body 15 as will be described further below.

A generally conical or frusto-conical valve plug 35 is mounted on a valve guide rod 40 by means of mutually cooperating threads and is secured in position with a nut 41. Valve plug 35 and its associated guide rod 40 are constrained to move axially within valve housing 30 by means of one or more stem guides 42. In the embodiment shown in FIG. 1, a single stem guide 42 is provided. In use, stem guide 42 bears against shoulder 43 formed in the stepped inner cylindrical surface of valve housing 30. A simple rubber O-ring washer 44 retains the guide rod 40 to stem guide 42 and thereby retains the valve plug and guide rod assembly within the valve housing.

Figure 4:
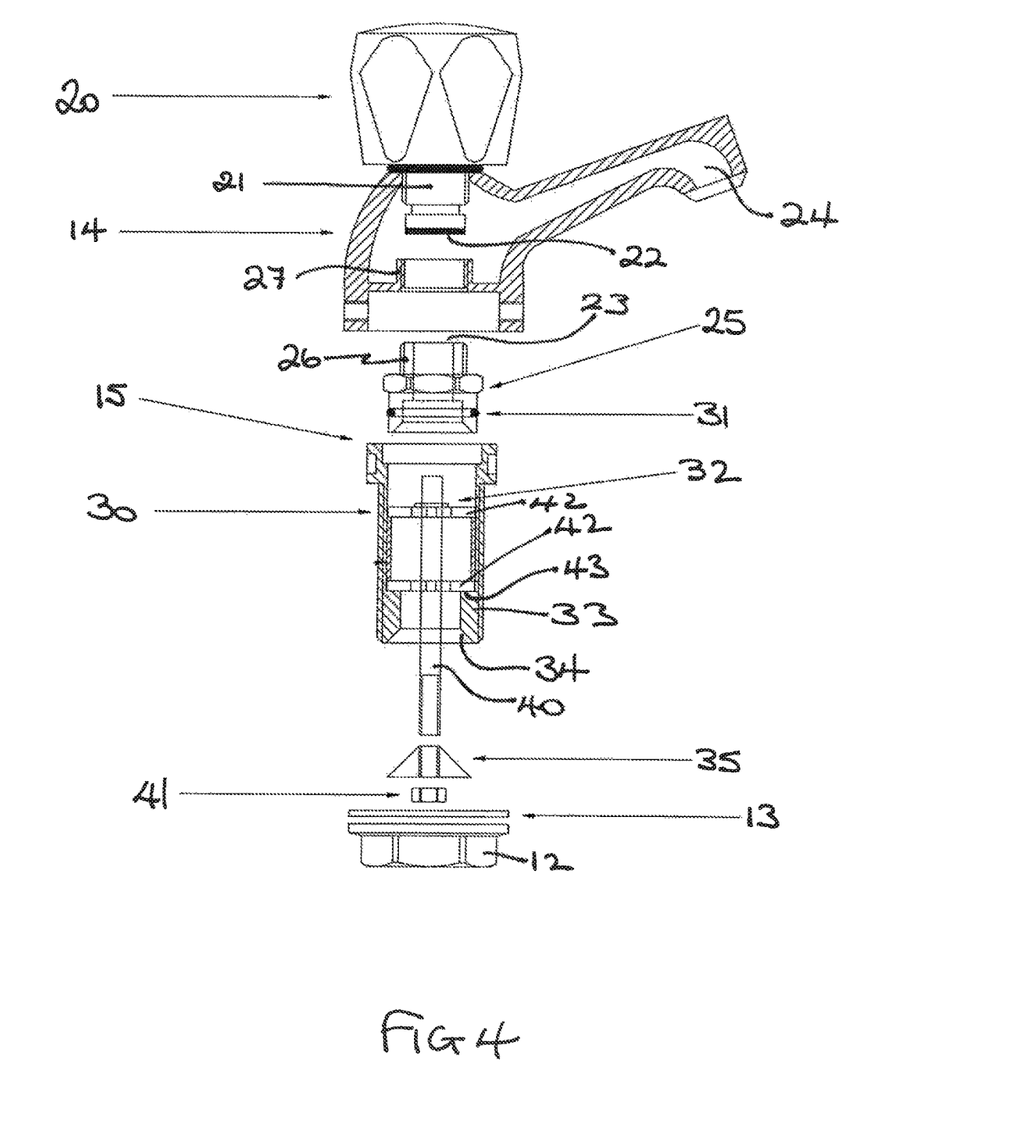
FIG. 4 is an exploded cross-sectional view of a modification of the tap of FIG. 1.
Figure 5:
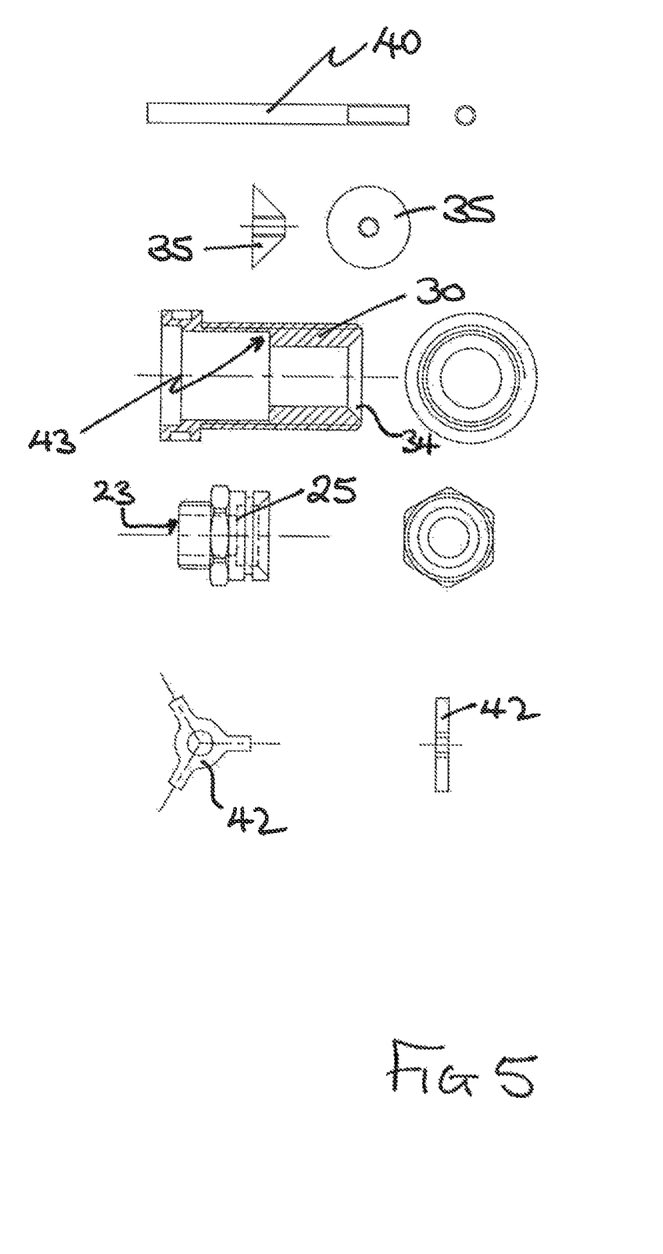
FIG. 5 shows, in cross-section and plan views, certain components of the tap of FIG. 4.

In the embodiment of FIG. 4, a pair of stem guides 42 are provided in a spaced relationship. This acts to ensure more positive axial movement with less risk of off-axis movement to guide rod 40. Alternative arrangements will be readily apparent to the skilled person. As shown in FIG. 5, stem guide 42 is suitably formed with a generally star-shaped appearance, such that there is as little interference with the flow of fluid as possible.

As shown in FIGS. 1 to 3, the entire tap is assembled by fitting tap seat body 25 to tap body 14; engaging valve body 15 with tap body 14 and securing the two components together with grub screws 45 passing through apertures formed in sidewalls of tap body 14 engaging recesses formed in valve body 15.

The operation of the tap will now be described in further detail, with particular reference to FIGS. 2 and 3. FIG. 2 shows the tap of the present invention in a normal operative configuration. The tap is operable in a conventional manner. Tap handle 20 is rotatable into a closed configuration (usually by rotation on a clockwise direction) until washer 22 bears against tap seat 23, thereby closing the flow of water through the tap body to spout 24 and defining a first configurational position for the tap. Rotation of handle 20 in the reverse direction, lifts washer 22 away from engagement with the tap seat 23 into a second configurational position, thereby allowing flow of water to spout 24.

Tap handle 20 is rotatable between a first configurational position in which tap washer 22 bears against tap seat 23 as described above; through a second configurational position in which tap washer 23 is spaced from tap seat 23 to allow flow of water through the tap; and to a third configurational position in which tap washer 23 is spaced further from the tap seat 23. In both of the first and second configurational positions, tap washer 23 bears against the upper end of valve guide rod 40.

The length of rod 40 is selected such that valve plug 35 is spaced from its valve seat surface 34 in both of these configurations to allow water to flow through valve body. The length is also selected such that, in the third configurational position, tap washer 22 is spaced from the upper end of valve guide rod 40 or contacts the rod but provides substantially no force against the rod. Accordingly, in the third configurational position, the pressure of water within the feed pipe to tail 11 of the tap bears against the outer surface of valve plug 35 and causes it to close against valve seat surface 34, thereby closing the tap assembly 10 from admission of water.

In this third configuration, the inside of the tap assembly downstream of valve 34, 35 is open to atmosphere rather than water pressure. As such, tap body 14 can be removed from valve body 15 following removal of grub screws 45.

With tap body 14 removed, maintenance can be carried out. For example, washer 22 can be replaced, valve seat 23 can be re-ground if necessary or tap seat body 25 replaced completely if life-expired.

Alternatively, the system of the present invention allows the development of a range of designs of tap bodies attachable to a common valve body 15, providing a simple mechanism for replacement of taps.

In contrast to the systems of the prior art, disconnection of the pressurised water flow to the tap is automatic rather than requiring the homeowner to operate a shut-off valve, with such valves often being in an inconvenient location, especially in the case of bath taps where the valve may be behind bath panels or tiles.

Additionally, the system of the present invention finds advantages in the construction industry. A "utility" design of tap body can be used during construction to test the pipework and can be replaced shortly before completion with the final tap body, thereby avoiding damage to possibly expensive tap bodies or theft.

Reinstatement of the water supply is simply the reverse process. The tap body 14 is located over the head of valve body 15 and secured thereto by grub screws 45. Handle 20 of the tap is then rotated towards the closed position. When washer 22 contacts rod 40 and begins to bear against it (second configurational position), valve plug 35 is caused to move away from its closed position against valve seat surface 34, thereby allowing admission of water to the tap. Further rotation of the handle takes the handle to the first configurational position where washer 22 bears against seat 23 to close the tap.

In preferred modifications (not illustrated), valve plug 35 and valve guide rod 40 are formed as a unitary element. Suitably, the unitary element is moulded (cast) or machined from a material compatible with the fluid with which the valve is intended to be used. For example, the unitary element may be cast or machined from an alloy, such as brass or from a polymeric material. Polyoxymethylene is a particularly preferred material, a resilient material compatible with many fluids, especially so with water. Polyoxymethylene is suitable for both machining or moulding and provides a smooth surface which exhibits low limescale adhesion.

In particularly preferred embodiments, the valve guide rod part of the unitary element is provided with longitudinal flutes or flanges radially dimensioned to provide a close fit between the unitary element and the inner cylindrical wall or surface of valve housing 30. By this means, stem guides 42 are unnecessary and may be omitted. The unitary element is advantageously formed with suitable retention means for axially retaining the element within valve housing 30.

It will be appreciated that alternative constructions can be envisaged within the scope of the present invention including other valve designs, such as ceramic disc valves and other quarter turn valve assemblies. It will also be appreciated that the valve may be activated by rotation about any axis, not merely co-axially with a rising spindle valve and/or may act through a lever arrangement.

Figure 6:
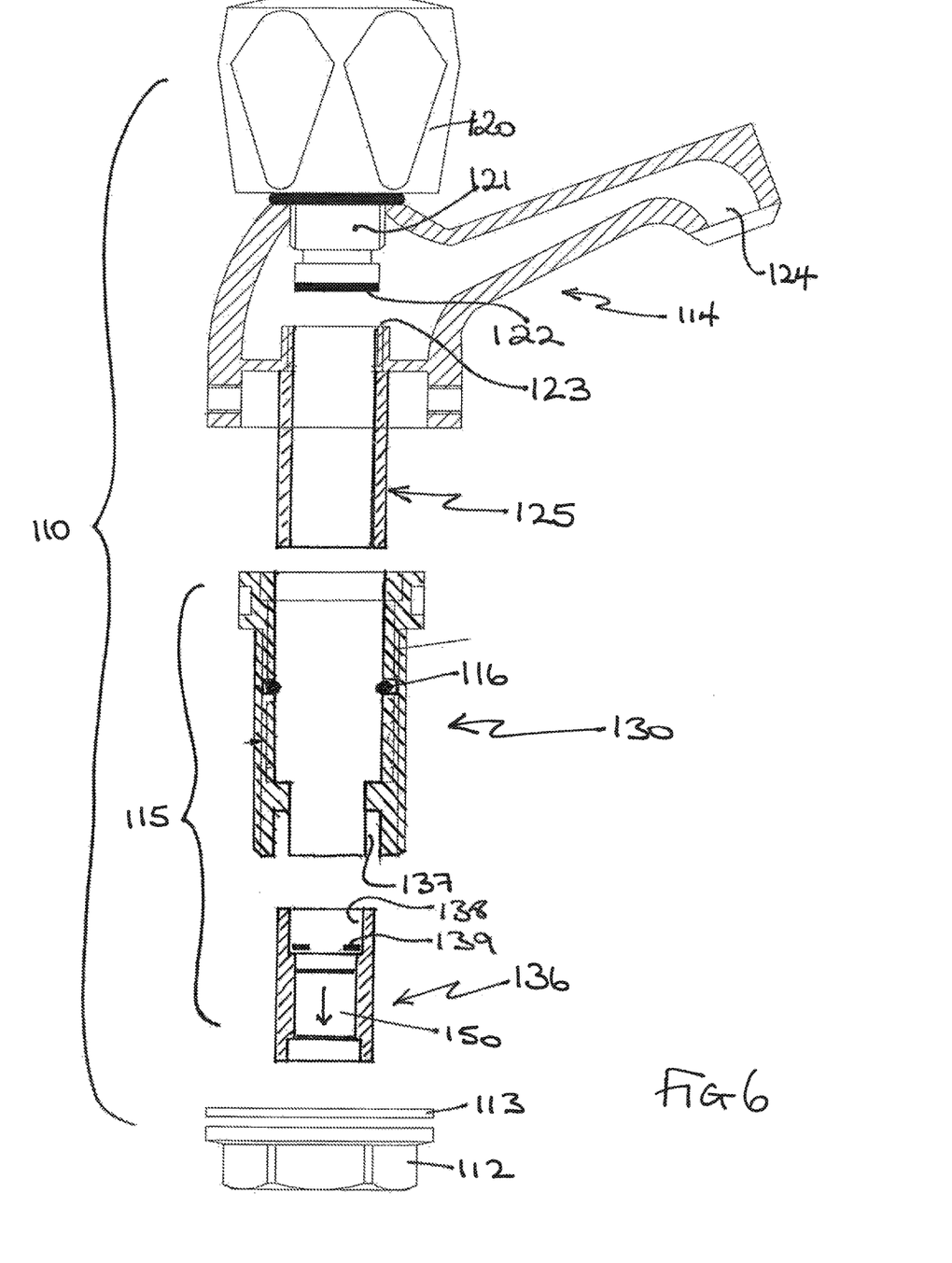
FIG. 6 is a cross-sectional view of a second embodiment of a tap in accordance with the present invention in a disassembled configuration.
Figure 7:
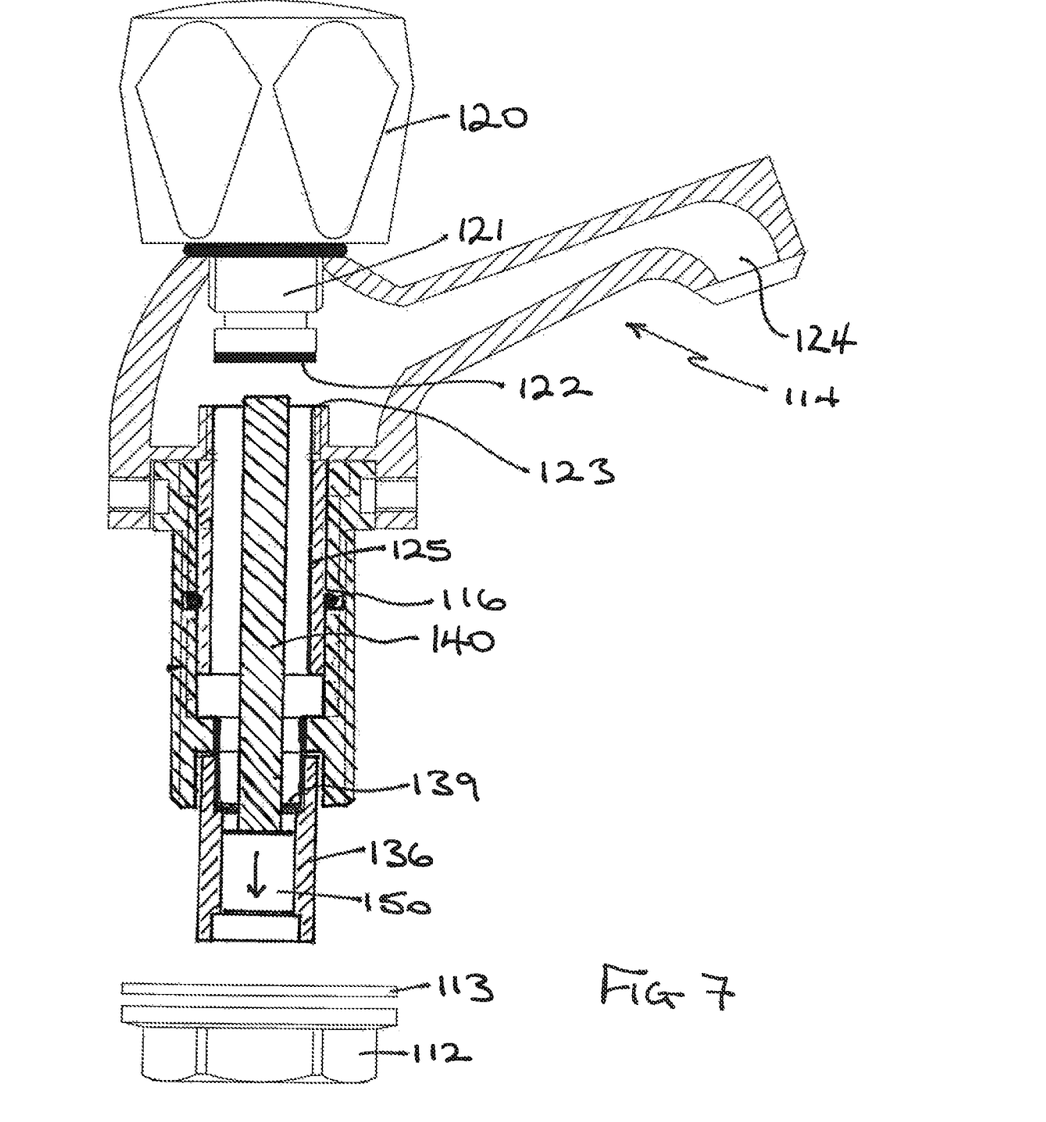
FIG. 7 is a cross-sectional view of the tap of FIG. 6 in an assembled configuration.

One alternative embodiment is illustrated in FIGS. 6 and 7. Where features are common to the embodiment described above, the same reference numerals are used, with the addition of the prefix 1 (eg, 10 becomes 110). In the embodiment shown, compared with the first embodiment, tap body 114 and tap seat body 125 are formed as a unitary component. It will be appreciated that the components may equally well be constructed with a demountable tap seat body as described above.

Valve body 115 is generally cylindrical in form and is attachable to tap body 114 in the same manner as described above and includes an O-ring seal 116 forming a seal between valve body 115 and a tail of valve seat body 125. In this embodiment, as shown, the valve is in the form of a demountable valve unit 136. Valve unit 136 is suitably attachable to valve body 115 by means of mutually cooperating threaded surfaces 137,138 and fluidly sealed by means of a washer 139. Similarly, valve unit 136 includes a threaded tail for operative connection to the water supply.

In this embodiment, valve unit 136 includes a valve 150 (shown schematically) of the one-way or non-return type arranged in its reverse orientation such that its permitted direction of flow is opposite to that of the flow of water through the tap. Accordingly, at rest, without tap head 114 attached to valve body 115, valve 150 prevents the flow of water from the water supply.

Non-return valves typically include a valve plug which is held in a closed configuration against a small biasing force, usually of a spring, but optionally of a resilient polymeric member. The flow of water in the normal desired direction opens the valve against the biasing force and a back flow causes the valve to close.

In the tap 110 of this embodiment, a rod 140 is provided (omitted from FIG. 6 for clarity) which, in normal use of the tap (between the first and second positional configurations), rod 140 is pushed by washer 122 to bear against valve 150 within valve unit 136 to urge the valve into the open position. Accordingly, with the tap closed, rod 140 bears against the valve and the valve is open. As the tap is opened, rod 140 continues to bear against the valve 150 retaining it in the open position against the biasing force. As the tap handle 120 is further rotated (from the second configuration to the third configuration), the separation between washer 122 and valve 150 exceeds the length of rod 140. Rod 140 ceases to bear against, and therefore open, valve 150, which consequently closes under the biasing force. The supply of water to the tap body is thus terminated and continued rotation of the handle allows the handle to be removed, for replacement of the washer, or allows the tap head 110 to be removed for replacement or repair.

Although described and illustrated in the context of a tap of the type used with a sink, basin or bath, it will be appreciated that the fluid control valve is equally suitable for use in other fields where control over the flow of fluids is required, such as in medical applications, dental applications, hydraulic or compressed air machinery and other plumbing installations, such as radiator valves, allowing disconnection of radiators; other vessels such as water tanks, expansion tanks and so on from their isolating valves without having to drain the entire heating system; and also pumps and flow meters.

The invention claimed is:

1. A fluid control valve comprising
   a valve body having an inlet, for operative connection to a supply of pressurised fluid, and an outlet and defining a fluid flow path therebetween;
   a first valve adjustable under the control of a first valve actuator between a first, or closed, position in which flow of fluid through the first valve is prevented and a second, or open, position in which flow of fluid through the first valve is permitted; characterised in that:
   the fluid control valve further comprises a second valve associated with the inlet or intermediate the inlet and the first valve,
   wherein the second valve comprises a second valve body and a second valve actuator adapted such that the first valve actuator bears against the second valve actuator in each of said first and second positions to urge the second valve into an open configuration allowing flow of fluid;
   and further wherein the fluid control valve is arranged such that the first valve actuator is adjustable to a third position in which the first valve actuator is spaced from the second valve actuator by a separation sufficient to allow fluid pressure at the inlet to cause the second valve to close, preventing flow of fluid through the fluid control valve; and wherein the first valve includes a valve seat and a valve head including a valve gear to which is mounted a washer for adjustment of a separation between the washer and the valve seat as the first valve head is rotated between the first and second positions; and wherein the washer or a washer mounting bears against the second valve actuator as the valve head is adjusted between the first and second positions to cause the second valve to open and becomes spaced from the second valve actuator in the third position; and wherein the valve seat is demountable from the fluid control valve body.

2. The fluid control valve as claimed in claim 1 wherein the second valve actuator is a rod.

3. The fluid control valve as claimed in claim 1 wherein the second valve body and the second valve actuator are formed as a unitary element.

4. The fluid control valve as claimed in claim 3 wherein the unitary element has substantially the form of a poppet or mushroom valve.

5. The fluid control valve as claimed in claim 3 wherein the unitary element comprises an axially fluted or flanged stem.

6. The fluid control valve as claimed in claim 5 wherein the axial flutes or flanges are longitudinal flutes or flanges radially dimensioned to provide a close fit between the unitary element and the inner cylindrical wall or surface of the valve housing.

7. The fluid control valve as claimed in claim 5 wherein the unitary element is formed of an alloy or polymeric material.

8. The fluid control valve as claimed in claim 7 wherein the unitary element is formed of a polyoxymethylene.

9. The fluid control valve as claimed in claim 1 wherein the first valve is a screw-down valve, gate valve, needle valve or globe valve.

10. The fluid control valve as claimed in claim 1 wherein the first valve actuator is a manually operatable actuator, or a pneumatically or electrically operatable actuator.

11. The fluid control valve as claimed in claim 1 in the form of a tap.

12. The fluid control valve in the form of a tap as claimed in claim 11 wherein the inlet is in the form of a tail for operative connection to a fluid supply and the outlet is in the form of a tap body having a spout.

13. The fluid control valve in the form of a tap as claimed in claim 12 wherein the tap body includes a valve seat and the tap head includes a tap gear to which is mounted a washer for adjustment of a separation between the washer and the valve seat as the tap head is rotated between the first and second positions; and wherein the washer or a washer mounting bears against the second valve actuator as the tap head is rotated between the first and second positions to cause the second valve to open and is spaced from the second valve body actuator in the third position by an amount sufficient to allow the second valve to close under the pressure of fluid at the inlet.

14. The fluid control valve in the form of a tap as claimed in claim 12 wherein the valve seat is demountable from the tap body.

15. The fluid control valve in the form of a tap as claimed in claim 12 wherein the first valve is mounted to the actuator.

16. The fluid control valve in the form of a tap as claimed in claim 12 wherein the valve body is demountable to the tap body.

17. The fluid control valve in the form of a tap as claimed in claim 11 wherein the valve body includes a threaded stem and has an enlarged head, wherein the tap body is securable to the enlarged head.

18. The fluid control valve in the form of a tap as claimed in claim 12 wherein the tail is formed integrally with the valve body.

19. The valve as claimed in claim 1 wherein the valve body includes a first valve seat wherein the first valve seat is demountable to the tap body.

20. The fluid control valve as claimed in claim 1 wherein the first valve is a screw-down or globe valve.

21. The fluid control valve as claimed in claim 1 wherein the first valve actuator is a manually operatable lever or wheel.

* * * * *